United States Patent [19]

Coleman

[11] 3,885,523

[45] May 27, 1975

[54] SANITARY FACILITY FOR ANIMALS

[76] Inventor: Bruce A. Coleman, 201 W. 86th St., New York, N.Y. 10024

[22] Filed: July 19, 1974

[21] Appl. No.: 490,209

[52] U.S. Cl. .................................. 119/1; 119/1
[51] Int. Cl.² .................................. A01K 29/00
[58] Field of Search .............................. 119/1, 19

[56] References Cited
UNITED STATES PATENTS

| | | | |
|---|---|---|---|
| 1,532,486 | 4/1925 | Harrington | 119/19 |
| 1,715,175 | 5/1929 | Stark et al. | 119/19 X |
| 2,932,279 | 4/1960 | Giles | 119/19 X |
| 3,085,550 | 4/1963 | Crawford | 119/1 |
| 3,227,137 | 1/1966 | Goldman et al. | 119/1 |
| 3,246,630 | 4/1966 | Dearing et al. | 119/1 |
| 3,428,026 | 2/1969 | Sohmers et al. | 119/19 |

Primary Examiner—Hugh R. Chamblee
Attorney, Agent, or Firm—Flynn & Frishauf

[57] ABSTRACT

A sanitary facility for animals, and more particularly a litter box for cats includes a tray having a first portion defining a toilet area and a second portion having a mesh or screen thereover defining an entrance and exit path for the animal. A removable top enclosure portion is provided and a divider partially separates the first and second portions of the box so as to provide a limited passageway therebetween. A doorway is formed in the cover which is offset relative to said passageway so as to provide a tortuous entry and exit path between said door and said toilet area. This forces the animal to walk over the mesh or screen portion so as to prevent litter from being kicked or carried out of the device.

14 Claims, 4 Drawing Figures

PATENTED MAY 27 1975 3,885,523

SANITARY FACILITY FOR ANIMALS

This invention relates to a sanitary facility for animals, and more particularly to a litter box particularly adapted for use by cats.

Various litter boxes for cats are known. The most pertinent sanitary facility to the present invention which is known by the present inventor is that disclosed in U.S. Pat. No. 3,246,630, issued Apr. 19, 1966 to D. G. Dearing et al. The difficulty with this sanitary facility, however, is that the cat may easily leap from the toilet area, through the entry-way without walking over the screen portion, thereby defeating the object of this patent. Further, litter can be kicked out of the Dearing et al. opening.

The object of the present invention is to provide a sanitary facility particularly adapted for use by cats which positively prevents a cat from leaping out of the box without walking over the screen or mesh portion and prevents litter from being kicked out of the box.

SUMMARY OF THE INVENTION

In accordance with the present invention, a divider is located to partially divide the screen or mesh portion of the sanitary facility from the toilet area so as to define a limited passageway therebetween. A doorway is provided in the cover which is offset from the passageway defined by the divider so as to force the cat or other animal to follow a tortuous path when exiting from the toilet area, thereby positively preventing the cat from leaping out of the box and spilling and tracking material from the toilet area outside of the sanitary facility. By virtue of the offset relationship, the divider blocks the doorway to prevent litter from being kicked out of the box.

DETAILED DESCRIPTION OF THE ILLUSTRATED EMBODIMENTS

Figure 1:
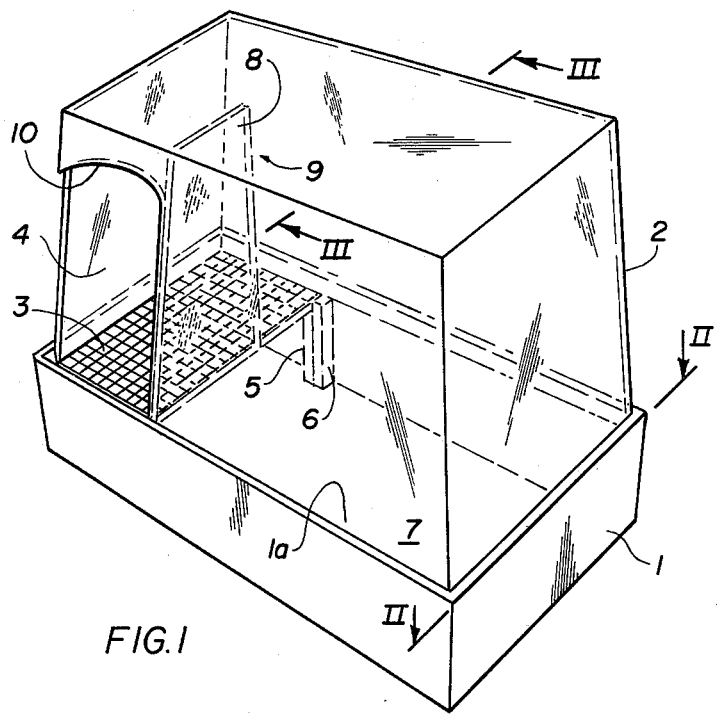
FIG. 1 is a perspective view of an embodiment of the present invention.
Figure 2:
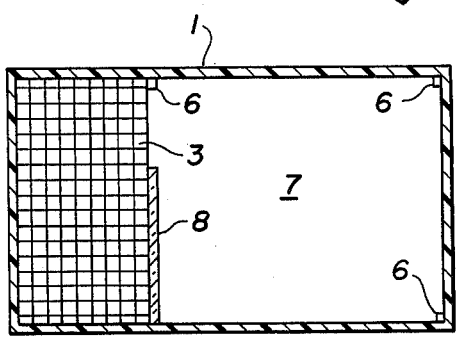
FIG. 2 is a cross-sectional view of the embodiment of FIG. 1 taken along the line II—II.

Referring to FIG. 1, a sanitary facility according to the present invention includes a base tray 1, which is relatively shallow, and an upper enclosure member 2 which is removably connected to the base member 1. The base member 1 has a screen or mesh member 3 therein which defines an entry and exit portion 4 of the sanitary facility. The screen or mesh member 3 may be non-removably mounted in the base member 1, or may be removably mounted therein by, for example, locating same upon a plurality of support members 5, only one support member 5 being shown for clarity in FIG. 1. Other mounting arrangements for screen or mesh member 3 can be used. The upper enclosure member 2, which is preferably transparent, fits within the base member 1 and is supported by a plurality of supports 6 (see FIG. 2). The portion of the sanitary facility not containing the mesh or screen member 3 defines the toilet area 7 in which may be placed absorbent material, or the like.

A divider member 8 is provided for partially dividing the toilet area 7 from the exit and entry area 4, a passageway 9 (FIG. 3) being defined by the divider 8. The upper enclosure member 2 has a doorway 10 formed therein which is offset relative to the passageway 9 so as to positively prevent a cat or other animal from leaping out of the toilet area 7 through the doorway without touching the screen or mesh 3. The offset relationship between the passageway 9 and the doorway 10 defines a tortuous exit path which forces the cat or other animal to pass over the screen or mesh 3 and to touch same before exiting through the doorway 10, so that litter on the animal's feet is caused to pass through the screen or mesh 3 into the base member 1. Also, the divider 8 prevents litter from being kicked out through the doorway 10.

In practice, the offset relationship between the doorway 10 and passageway 9 has been found to be an extremely effective arrangement which is a great improvement over the presently known sanitary facilities. In all of the known facilities, spilling and tracking of litter from the toilet area is a major problem which is obviated by the arrangement of the present invention. The mesh member 3 and base member 1 are preferably rectangular and the longer dimension of the mesh member 3 is preferably oriented in the direction of the shorter dimension of the tray member 1 so as to maximize the size of the toilet area and to maximize the length of the exit and entry path.

The divider member 8 may be carried by the upper enclosure member 2, as is illustrated in FIG. 1. When the apparatus is formed of plastic material, the divider 8 is preferably bonded or integrally formed with the upper enclosure member 2. Alternatively, the divider 8 may be mounted to the edge of the screen member 3.

Figure 3:
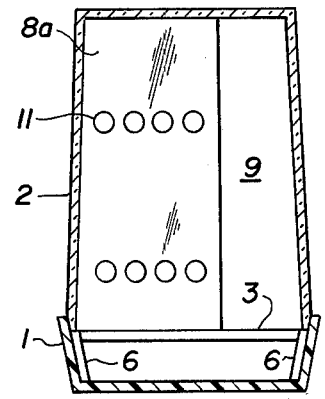
FIG. 3 is a cross-sectional view of the embodiment of FIG. 1 taken along the line III—III, but with a different type of divider element.

FIG. 3 shows a modified divider member 8a having holes or other openings 11 formed therein. The holes 11 provide for ventilation of the toilet area.

Figure 4:
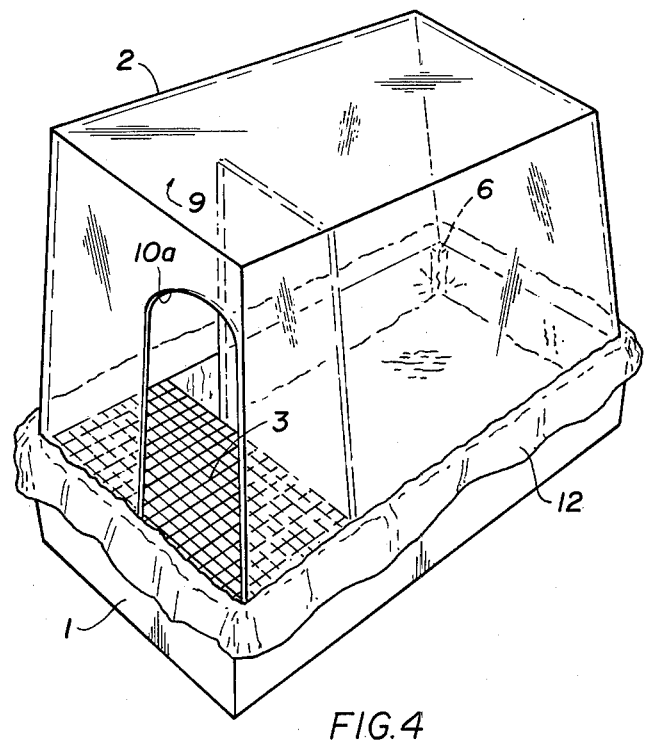
FIG. 4 is a perspective view of a modified embodiment of the present invention.

FIG. 4 shows a modified embodiment of the present invention wherein the doorway 10a is provided in a different offset relationship relative to the passageway 9. The arrangement of FIG. 4 still provides a tortuous entry and exit path for the animal, thereby positvely causing the animal to walk over the mesh or screen 3 so as to prevent litter from being spilled and tracked outside the sanitary facility.

The embodiment of FIG. 4 shows the use of the disposable bag 12 (shown transparent in FIG. 4). The disposable bag 12 facilitates cleaning of the sanitary facility. In the FIG. 4 embodiment, the screen or mesh 3 is removable as should be apparent from the location of the disposable liner 12.

It should be clear that various modifications and alterations to the illustrated sanitary facility may be made within the scope and spirit of the present invention as set forth in the claims. For example, the facility need not be made with a transparent upper enclosure 2, but may be made translucent or opaque. The materials used are not relavent to the inventive concept and if desired, a divider may be located in the lower member 1 extending upward from the base 1a thereof to approximately the height of the screen or mesh member 3 so as to positively divide the toilet area from the entry and exit area. The screen or mesh member 3 may be made of metal, plastic or any other suitable material, the limitation being that the openings of the screen or mesh member 3 be large enough to allow litter from the toilet area to fall therethrough.

From a medical point of view, it is preferred that the upper enclosure 2 be transparent. This enables the animal owner to observe the animal in the toilet area. This is particularly important in connection with male cats which may contract illnesses which exhibit themselves by difficulty in eliminating urine. This difficulty in eliminating urine can be immediately and easily observed by the owner if the upper enclosure member 2 is transparent, thereby warning the owner to seek medical attention for the animal at the onset of the disease.

It is also possible to modify the interconnection between the upper enclosure 2 and the lower base member 1, for example as taught in U.S. Pat. No. 3,246,630. The manner of interconnection of the upper enclosure member 2 with the lower base member 1 is not critical.

I claim:

1. A sanitary facility for animals comprising:

a lower, relatively shallow tray member;

a raised horizontal screen or mesh member extending across a portion of said tray and defining an entry and exist area, the remainder of said tray defining a toilet area for receiving litter;

a top removable enclosure removably positioned over said tray, said enclosure having an entry and exit opening through at least one wall thereof, said opening extending above said screen or mesh member and being in communication with said entry and exit area of said tray; and means for preventing litter from being tracked out of said toilet area, including a divider member partially dividing the entry and exit area of said tray from the toilet area of said tray and defining a passageway between said toilet area and said entry and exit area, said passageway extending above the litter and screen or mesh member and being offset relative to said opening formed in said upper enclosure member so as to define a tortuous entry and exit path for the animal over said screen or mesh member and between said opening and said passageway, whereby any litter or the like picked by the animal is caused to fall on said screen or mesh member.

2. The sanitary facility according to claim 1 wherein said divider member extends substantially vertically.

3. The sanitary facility according to claim 2 wherein said divider member extends from at least the level of said screen or mesh member to the uppermost part of said enclosure member.

4. The sanitary facility according to claim 3 wherein said divider member is secured to said enclosure member.

5. The sanitary facility according to claim 1 wherein said divider member further has a plurality of apertures or openings therein so as to provide ventilation for said toilet area.

6. The sanitary facility according to claim 1 wherein said lower tray member is substantially rectangular and wherein said screen member is a rectangular member having its longer side extending fully across the shorter dimension of said rectangular lower tray member.

7. The sanitary facility according to claim 6 wherein said passageway is defined along the longer dimension of said screen or mesh member and the opening of the upper enclosure member substantially extends across the shorter dimension of said rectangular screen or mesh member, thereby forming a substantially L-shaped entry and exit path for the animal.

8. The sanitary facility according to claim 6 wherein said passageway is defined along the longer dimension of said rectangular screen or mesh member and said opening in said upper enclosure member extends along said longer dimension of said screen or mesh member, but on the opposing side thereof so as to define a substantially Z-shaped entry and exit path for the animal.

9. A sanitary facility according to claim 1 wherein said passageway and said opening are oriented so as to define a substantially L-shaped entry and exit path for the animal.

10. The sanitary facility according to claim 1 wherein said opening and said passageway are located so as to define a substantially Z-shaped entry and exit path for the animal.

11. The sanitary facility according to claim 1 wherein said top enclosure is transparent.

12. The sanitary facility according to claim 1 wherein said divider is located to block said entry and exit opening to prevent material from said toilet area from being kicked out of the sanitary facility.

13. The sanitary facility according to claim 1 wherein said opening extends upwardly from a level substantially corresponding to the level of said screen or mesh member.

14. The sanitary facility according to claim 13 wherein said passageway extends upwardly from a level substantially corresponding to the level of said screen or mesh member.

* * * * *